UNITED STATES PATENT OFFICE.

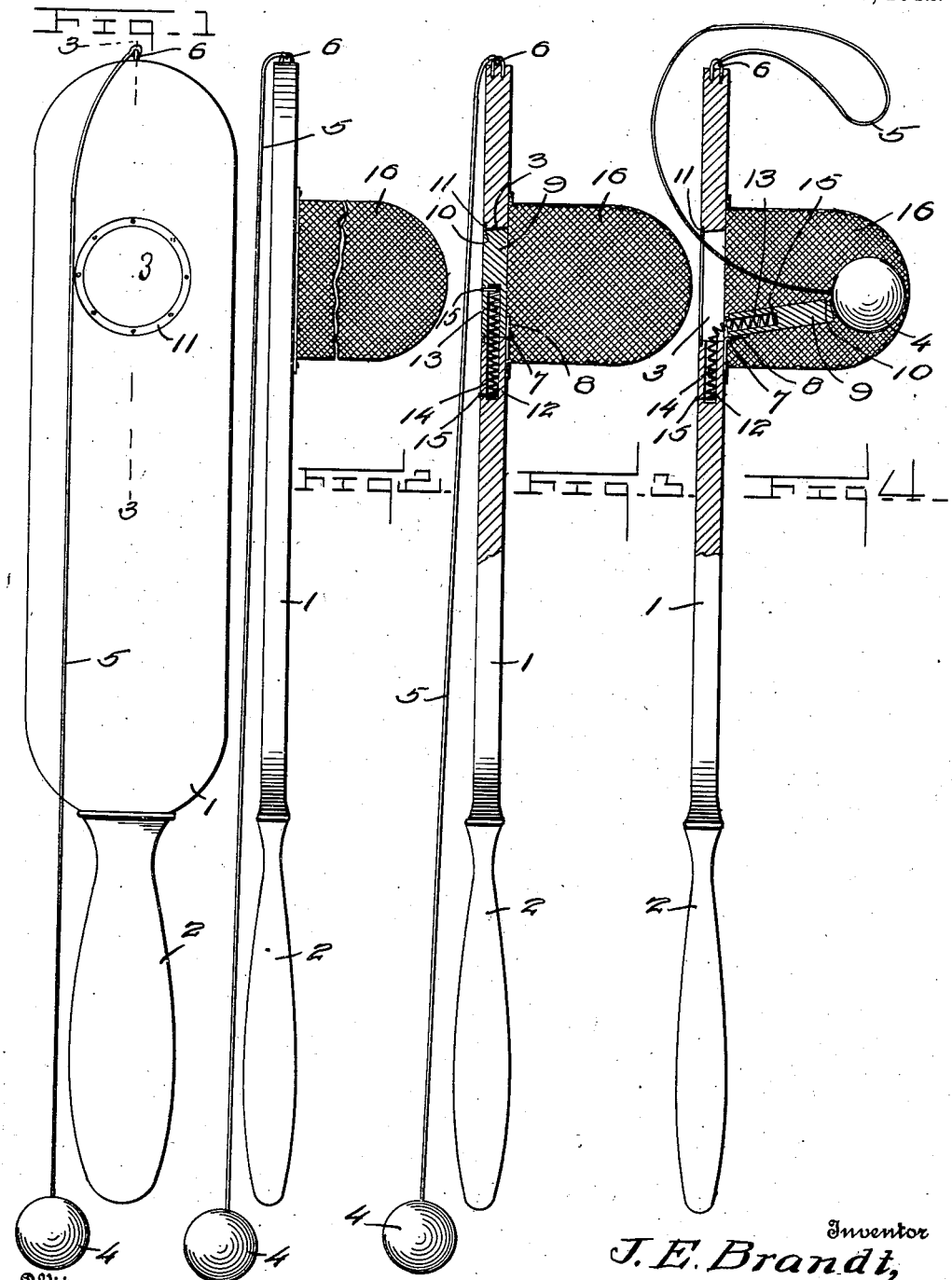

JULIUS E. BRANDT, OF LINDSBORG, KANSAS.

BALL AND CATCHER TOY.

1,017,376.  Specification of Letters Patent.  Patented Feb. 13, 1912.

Application filed March 23, 1911. Serial No. 616,314.

*To all whom it may concern:*

Be it known that I, JULIUS E. BRANDT, a citizen of the United States, residing at Lindsborg, in the county of McPherson and State of Kansas, have invented certain new and useful Improvements in Ball and Catcher Toys, of which the following is a specification.

My invention relates to improvements in ball and catcher toys and the leading object of my invention is the provision of an improved toy of this character which will produce the illusion of the ball passing through the solid paddle when the toy is skilfully handled.

A further object of the invention is the provision of a paddle having a return ball secured thereto and having a pocket for receiving the ball when the paddle is skilfully wielded, whereby the paddle may be employed either to bat the ball or in the attempt to catch the ball in the pocket as desired.

Other objects and advantages of my improved toy will be apparent from the following description taken in connection with the drawings, and it will be understood that I may make any modifications in the construction shown and described within the scope of the claims without departing from or exceeding the spirit of the invention.

Figure 1 represents a top plan view of my toy. Fig. 2 represents a side elevation thereof. Fig. 3 represents a longitudinal sectional view on the line 3—3 of Fig. 1 showing the trap door in closed position, and Fig. 4 represents a similar sectional view showing the door in open position.

In the drawings, the numeral 1 designates the oblong bat or paddle of my device which is preferably formed of pine or other light wood and has the turned or rounded wooden handle 2 formed integral therewith at one end.

Formed centrally in the paddle 1 is the aperture 3 which I have shown as circular in form and of greater diameter than the diameter of the return ball 4 which is connected by the cord 5 with the eye 6 secured to the end of the paddle.

To normally close the aperture 3, I secure to the under side of the paddle adjacent the aperture the hinge 7 having its projecting leaf 8 secured to the under side of the trap door 9 which is of size to fit in and close the aperture 3, while to limit the upward movement of the trap door I form in its upper edge the groove or recess 10 into which fits the inlaid or sunk circular plate or ring 11 which is flush with the face of the paddle and projects inward slightly around the edge of the aperture 3, said plate being painted or finished in the same color as the face of the paddle to be normally unnoticed.

To hold the door 9 tightly against the ring 11 in closed position to be flush with the face of the paddle, I employ a suitable spring member, and in the drawings I have illustrated the paddle and door as formed with the alined sockets 12 and 13 in which are engaged the helical spring 14 having its ends secured to the paddle and to the door by the fastenings 15, the depression or opening of the trap door stretching said spring to cause the spring to close the trap door by its contraction as soon as the pressure is removed therefrom.

In the use of my toy, the ball is swung through the air and the attempt is made to cause it to impinge against the center of the door 9 to force the door open and allow the ball to pass through the aperture 3 into the wire mesh net or receptacle 16 secured behind the door, the spring 14 closing the door after the ball has passed into the net.

From the foregoing description taken in connection with the drawings, the construction of my toy will be readily understood, and it will be seen that I have provided an interesting and amusing toy which combines the features of a bat and return ball with the features of a suspended ball and a net device for catching the same, and it will further be observed that I have provided a device which will provide considerable entertainment, in that frequent practice with the same will be found necessary to become so skilled in its use as to be able to cause the ball to strike the right point on the door to open the door and pass into the net instead of merely bouncing away from the door as will be the case when the door is incorrectly struck.

I claim:

1. A toy, comprising a bat having a central aperture formed therein, a netted receptacle secured to one face of the bat below the aperture, a door pivoted to the bat to close the aperture, said door being so pivoted as to swing into the receptacle, the bat and door having alined sockets formed therein, a coil spring mounted in said sockets and having one end secured to the bat and the other to the door to swing the door into closed position, and a return ball secured to the bat and of less diameter than the aperture in the bat, whereby the ball may be passed through the aperture into the receptacle therebelow.

2. A toy, comprising a bat having an aperture formed therein, a trap door hinged to the under side of the bat and forming a closure for the aperture, a spring device for normally holding the door in closed position, a receptacle secured to the under face of the bat around the aperture, and a return ball secured to the bat, the diameter of the ball being less than the diameter of the aperture, whereby the ball may be passed through the aperture by skilfull wielding of the bat.

In testimony whereof I affix my signature, in the presence of two witnesses.

JULIUS E. BRANDT.

Witnesses:
C. V. ANDERSON,
DAVID BACHMAN.